UNITED STATES PATENT OFFICE.

GROVE JOHNSON AND PERCY RICHARD HARE, OF BROMLEY, ENGLAND.

FERMENT AND PROCESS OF PRODUCING THE SAME.

No. 830,506.  Specification of Letters Patent.  Patented Sept. 11, 1906.

Application filed March 10, 1904. Serial No. 197,454.

*To all whom it may concern:*

Be it known that we, GROVE JOHNSON and PERCY RICHARD HARE, subjects of the King of Great Britain, residing at 8 Hawes road, Bromley, in the county of Kent, England, have invented certain new and useful Improvements in Ferments and the Processes of Producing the Same, of which the following is a specification.

This invention relates to the newly-discovered ferment which we have isolated and termed "*Saccharomyces thermantitonum,*" (the heat resister.)

The ferment hereinbefore referred to and which constitutes the essential feature of our invention was discovered while experimenting with a view to ascertaining the fermenting properties of Eucalyptus leaves, the said ferment being obtained by immersing the leaves of the Eucalyptus plant in a saccharine solution. Observations taken while thus under treatment disclosed the fact that fermentation was taking place. Microscopical examination of the mixture and the subjecting of the same to various tests and experimental trials resulted in the determining of a hitherto unrecognized organism eminently adapted to promote alcoholic fermentation.

The ferment may be produced in the following manner: A solution, at a temperature of 160° Fahrenheit, of previously-boiled inverted sugar or malt wort should be taken in a clean bottle partially filled with Eucalyptus leaves. The bottle should thereupon be closed, and in a few days time a deposit consisting of cells of *Saccharomyces thermantitonum* will be found at the bottom of the bottle. These cells should be collected and propagated, the process being repeated until sufficient cells have been obtained. If upon microscopical examination the said cells are found to be intermixed with cells other than *Saccharomyces thermantitonum,* they may be purified by any of the ordinary methods commonly adopted by bacteriologists.

We are aware that it is a well-known proceeding to immerse the promoter of the organism desired in a saccharine solution and to allow the cells to deposit for the purpose of separating them from the fermented liquids. There is, however, no known alcoholic ferment which will live after being submitted to a temperature above 165° Fahrenheit. That this is the accepted fact may be proved by reference to any of the best known authorities on the subject, viz: Dr. Henri Van Laer, of Brussels; Dr. Harold Johnson, of Brussels; Dr. Pasteur, of Paris; Dr. Pitoy, of Paris; Dr. Hansen, of Copenhagen. The state of knowledge according to these accepted authorities up to the time of the present invention was restricted to alcoholic ferments which cannot live after being submitted to a temperature of 165° Fahrenheit in a solution. The ferment forming the essential feature of the present invention will submit to a temperature of at least 170° Fahrenheit and still live. The characteristic features whereby the said ferment may be recognized are as follows: The cells, if magnified by a one-fifteenth objective, appear somewhat smaller than *Saccharomyces cerevisiæ* and oval rather than round. The cells are rarely in a state of dissociation, but are usually observable in compact masses hanging together closely by means of a membranous substance, and this will be the more apparent if a few cells (or a few granules consisting of an agglomeration of cells) be exposed for some hours in a quantity of water maintained, for example, at a temperature of 120° Fahrenheit. The compact granules spread out into skinny flocculent particles somewhat resembling cobweb, in which the cells are seen to be enmeshed. This membranous substance or web containing cells in their embryonic state is, moreover, observable by the naked eye—as for example, when a bottle charged with fermented wort containing the said ferment was allowed to stand with a view to the mature cells settling or becoming deposited observation disclosed the aforesaid membranous substance in which the embryotic or immature cells were seen in a state of suspension. These floating particles were found arranged at different altitudes, according as the cells became developed, the tendency of the mature cells being always to subside. The said ferment sustains a temperature of 170° Fahrenheit without destruction; but it is undesirable to maintain this temperature for too long a period. The character of the ferment in resisting destruction at this temperature facilitates the cleansing of impure cultures by repeated washings with hot water, disease ferments, for the greater part, dying at 131° Fahrenheit. The result of the said repeated washings (the ferment having been allowed to settle into a compactness, which occurs in about fifteen minutes after being briskly agitated in a clear water) is a grayish, gelatinous, though granulated, substance, somewhat similar in composition and consistency to the soft roe of a herring.

It has been found that any-sized bottle of nutritive solution filled with leaves of the Eucalyptus lightly placed therein will have sufficient cells of *Saccharomyces thermantitonum* propagated within a fortnight to be visible to the naked eye.

The hereinbefore-described ferment is capable of inciting alcoholic fermentation within a wide range of temperature, the temperatures most favorable to the action of the said ferment being between 80° and 110° Fahrenheit. The action is, however, difficult and slow if the temperature fall below 50° Fahrenheit or rise above 131° Fahrenheit. It has been found in practice, moreover, that if the process be carried out under pressure the action of the ferment in saccharine solutions below 55° Fahrenheit is accelerated.

During fermentation the ferment rises in flocculent masses from the bottom of the vessel (it is a bottom ferment) apparently with the assistance of the carbon dioxid generated. As the gas is liberated upon the surface of the liquid the ferment descends again, the alternating movement continuing until fermentation ceases. The ferment while performing its function rarely renders the fermenting liquid turbid, as usually happens in the case of ordinary yeasts. On the contrary, it has somewhat the appearance of "finings" suspended in a more or less clear supernatant liquor.

At the close of fermentation the ferment falls to the bottom of the liquid and in a short space of time settles in a firm and compact mass resembling in consistency yeast from a brewer's yeast-press. This mass will also appear to somewhat resemble common yeasts in respect of color; but after repeated washings in hot water it will regain the before-mentioned characteristic gray color.

Pasteur has shown that a maintained temperature of 140° Fahrenheit is sufficient to kill alcoholic ferments; but our said ferment after being submitted in a saccharine solution to a temperature of 142° Fahrenheit for six hours commenced to perform its functions after a period of repose of eight hours in the same solution reduced to a temperature of 105° Fahrenheit. After several hours heating at 140° the ferment loses its gelatinous appearance and takes the form of a coarse gray powder, which may lie dormant for two or more days. Upon the resuscitation of the ferment it again gradually assumes its flocculent condition and ultimately reverts to all its normal characteristics. The power of the said ferment in inverting cane-sugar is very marked, as may be readily demonstrated, for example, by digesting a solution of pure crystallized cane-sugar with some of the ferment in a water-bath maintained at 140° Fahrenheit. In about an hour's time distinct inversion will have commenced, which may be proved by resorting to the test of Fehling's solution.

We may here mention that no deterioration of the ferment has been observed in fermenting pure solutions of uninverted cane-sugar. For example, a liter of a solution of pure crystallized cane-sugar of a specific gravity of 1.050, containing twenty-five grams of the said ferment, and a liter of a solution of levulose of a like gravity, containing a like amount of ferment, were set to work in a water-bath maintained at 100° Fahrenheit. Except for the fact that the cane-sugar occupied three hours longer than the levulose to accomplish complete fermentation—viz., fourteen hours instead of eleven hours, as in the case of the inverted sugar—there was no apparent difference to be observed. Each solution yielded approximately forty grams of ferment, and microscopical examination revealed no "collapse" of the cells from the cane-sugar solution. The fermented product should be withdrawn from the presence of the ferment and conveyed to closed vessels as soon as convenient after fermentation is complete, a period of repose being necessary to allow of the deposition of immature cells. This period will probably vary very little in practice from that ordinarily required after fermentation by ordinary yeasts; but possibly a slight reduction in the time will be experienced.

It has been found in practice that the solution in which it is desired to propagate the cells should provide all necessary nourishment for *Saccharomyces thermantitonum*. This differs in no way from solutions suitable for other *Saccharomyces*.

For feeding the propagated cells raw-sugar solution may be employed occasionally, though it is inadvisable to do this, as *Saccharomyces thermantitonum*, in common with ordinary yeast, yields up its enzyme for the purpose of the conversion of its non-assimilable food and eventually ceases to work and finally dies of inanition.

It has been found in practice that for the fermentation of beers, as well as for the propagation of the culture, temperatures of the worts should be maintained at 90° to 110° Fahrenheit.

All specific gravities are suitable. Obviously, however, if it be desired to propagate as many cells as possible without continually supplying new nutritive solution the higher the gravity so much longer will there be nutritive matter upon which the cells may live and increase.

Having explained the characteristic differences between the ferment and the *Saccharomyces* hitherto known and employed, it may be useful to state some of the advantages resulting from the use of the ferment. Brewers, according to present practice, (regulated, obviously, by the conditions under which alcoholic fermentation by yeast is accomplished,) are compelled to use large areas of coolers, refrigerators, or like appliances, entailing cost of water or of pumping, waste of time, labor, and of valuable space, with the contingent risk of putrefaction or adulteration during exposure. These objections are obviated by carefully observing the following rules in connection with the use of the hereinbefore-described ferment. The wort is to be conveyed without loss of time from the hop-back, as hot and bright as possible, to the fermenting vessel. Preferably this should be done without the intermediate use of settling-tanks and the like, providing always that the wort runs bright, the great object being to avoid exposure and loss of temperature, thus jeopardizing sterility. The fermentation is conducted in covered vessels, preferably constructed of metal, provided with manholes, such cocks as may readily suggest themselves, pressure-valves for permitting the escape of excess of carbon dioxid and attemperators or some suitable construction of "jacket" to control the temperature. The wort should be introduced into the fermenting vessel as hot as possible—say, for example, at 180° Fahrenheit. Although we have found the temperature (180° Fahrenheit) here referred to desirable with a view to effecting perfect sterilization, it will probably be unnecessary in practice to collect the wort at such temperature. Having introduced the wort, the manhole should immediately be closed. The temperature should then be allowed to fall, either spontaneously or, if time be an object, with the assistance of the attemperator or jacket, to 120° Fahrenheit, the ferment being then introduced through the manhole and well "roused" in, after which the manhole should be closed. Fermentation will commence immediately and proceed with increased vigor as the temperature falls to 105° Fahrenheit. Should there be a tendency for the temperature to fall below 95° Fahrenheit before fermentation is complete, (although this is unlikely to happen with large volumes of liquid) hot water or steam should be passed into the jacket or attemperators for the purpose of maintaining the requisite temperature. The precise quantity of ferment necessary for accomplishing complete fermentation within the time limit regulated by the temperature falling from 120° Fahrenheit to 90° Fahrenheit is ascertainable only by experience. Any excess, by weight, of the ferment as compared with ordinary yeast will not, however, be injurious, as, according to our experience, no flavor resembling "yeast bite" is imparted under normal conditions. In a specific case we have found that half a pound of *Saccharomyces thermantitonum* added to every thirty-six gallons of malt wort produces a rapid and healthy fermentation; but, in common with all yeasts, the quantity may be reduced—for example, to six ounces per thirty-six gallons—if the total bulk of beer to be fermented is great. To make our meaning more clear, an amount of six ounces per thirty-six gallons would be sufficient in a total bulk of, say, fifty barrels, while eight ounces per thirty-six gallons would be advisable in a total bulk of, say, ten barrels. In short, the greater the volume to be fermented the less proportionately (of yeast) will be required to ferment it. One of the chief reasons for the above fact in relation to *Saccharomyces thermantitonum* is as follows: The large volume of wort of necessity maintains its temperature of 110° Fahrenheit for a longer period than a lesser volume. (This is self-evident.) *Saccharomyces thermantitonum* grows with greater abundance (and consequently converts sugar to alcohol quicker) at a temperature between 100° and 110° Fahrenheit. If the temperature fell to, say, 70° or 80° Fahrenheit, as it could easily do in a few hours in winter-time in a small volume, it is surely obvious that to obtain a more rapid fermentation while the temperature was still high—110° Fahrenheit, for example—more yeast added to the wort would effect this, (rapid fermentation,) and, again, obviously eight ounces of *Saccharomyces thermantitonum* to thirty-six gallons of wort would do more work than six ounces before the temperature of the wort had a chance of falling. In short, the chief object to be aimed at is as follows: The greater part of the fermentation should be accomplished before the total bulk of wort collected at 110° Fahrenheit has a chance of falling below 90° Fahrenheit, and if six or eight ounces of *Saccharomyces thermantitonum* per thirty-six gallons is unable to do this, even ten or twelve ounces should be employed; but this of necessity varies according to the temperature of the atmosphere and the material or thickness of the fermenting vessel, or whether it is exposed to easily-altered conditions, drafts, thin walls, or metal roofing, and so forth.

As for the steps of the process, they do not vary at all from ordinary brewing practice except that the wort should not be allowed to cool.

If it be desired to obtain perfect fermentation with the improved ferment, while avoiding all chances of contamination in a sterile wort, the wort must be collected in the fermenting vessel at a temperature not less than 175° Fahrenheit, the ferment being immediately inserted and the manhole pertaining to the vessel closed. Care must then be taken to reduce the temperature as rapidly as possible with the means provided to about 105° Fahrenheit, because, as we have already demonstrated, length of time and exposure to high temperatures causes the ferment to become dormant, varying in extent according to the period it is so exposed.

As hereinbefore described, the ferment will work well under pressure of its own gas ($CO_2$) generated during fermentation. This fact may be taken advantage of for racking and bottling under pressure. If it be desired to hasten clarification with a view to enabling bright and well-aerated beer to be drawn off within a few days of brewing, finings may be forced at a suitable period, by means of a pump, into the fermenting vessel, the latter being constructed as hereinbefore described. In this process the employment of the said construction of fermenting vessels would be necessary, although for ordinary purposes such vessels are not indispensable to the successful employment of the ferment.

As a result of the employment of the hereinbefore-described ferment the action of yeast-pressing and the employment of the product with its crude taste is rendered unnecessary, the ferment settling spontaneously in a compact mass upon the completion of each fermentation. Moreover, the process of brewing in tropical countries or during periods of high temperature is rendered capable of accomplishment without being subjected to the difficulties and considerable expense incidental to the employment of ice plants rendered necessary by the use of common yeast. It may with appropriateness be remarked that the ferment appears to be the organism provided by nature to overcome all the difficulties due to atmospheric temperatures of 80° Fahrenheit and upward.

Non-alcoholic beer can be perfectly produced by the employment of the ferment by observing the following rules: first, worts must be prepared with a view to obtaining the highest possible percentage of non-reducing carbohydrates. As stated above respecting favorable temperature for fermentation, it is merely necessary to reduce the temperature of the fermenting wort to suspend fermentation, the ferment precipitating to the bottom of the vessel, thus allowing the clear beer to be drawn off. This fermented product is then boiled to either eliminate alcohol or to reduce it to the percentage allowed by the excise. Cooled, filtered, and aerated, the result is a non-alcoholic beer of a quality unobtainable by the use of hitherto-recognized *Saccharomyces*. Concentrated beer may be obtained by evaporating the last-mentioned preparation by the aid of suitable means, such as steam or water pans, it being simply necessary after obtaining the syrup to again dilute and aerate it, whereupon the condition it assumed before evaporation will be reverted to. It may here be remarked that the production of non-alcoholic and concentrated non-alcoholic beer in the manner and of the character above referred to would be impossible if ordinary yeasts were employed, because suspension of fermentation (if achieved) would not necessitate the immediate separation of the ferment, and if fermenting worts were boiled containing common yeasts they would be rendered wholly unpalatable.

The advantages above mentioned respecting the application of our said ferment to brewing will be similarly appreciable in connection with distilling. In the latter connection the worts may be fermented at the earliest moment possible after leaving the mash-tun and the fermented product conveyed in almost a bright condition to the still. The ferment reposing in a compact mass at the bottom of the fermenting vessel may be employed for succeeding operations, thereby dispensing with the present necessity of providing new yeast incidental to the destruction of the greater part of the ferment in the still.

Fruit juices and other saccharine solutions may with advantage be fermented with the aid of the hereinbefore-described ferment; but it will be obvious that, before fermentation by the said ferment alone can be assured, solutions which bear natural ferments must be raised in temperature in order to annihilate these organisms.

The alcoholic fermented liquors herein described, together with the process of fermenting liquors, are not claimed herein, but form the subject-matter of an application filed by us on September 13, 1904, Serial No. 224,328.

Having thus described our invention, what we claim, and desire to secure by Letters Patent, is—

1. An alcoholic ferment formed from Eucalyptus leaves and a saccharine solution and capable of resisting destruction at a temperature greater than 165° Fahrenheit.

2. An alcoholic ferment formed from Eucalyptus leaves and a previously-boiled inverted sugar or malt wort and capable of resisting a temperature of 165° Fahrenheit.

3. An alcoholic ferment formed from Eucalyptus leaves and a saccharine solution and capable of resisting destruction at a temperature greater than 165° Fahrenheit and of separating in a hard and compact mass at the end of fermentation.

4. A ferment formed from Eucalyptus leaves and a saccharine solution and yielding alcohol.

5. A ferment formed from Eucalyptus leaves and a saccharine solution and capable of inverting cane-sugar.

6. An alcoholic ferment capable of resisting a temperature above 165° Fahrenheit and settling at the close of the ferment in a firm and compact mass.

7. A ferment yielding alcohol, formed by Eucalyptus leaves and a saccharine solution and capable of inverting cane-sugar.

8. The process of forming an alcoholic ferment which consists in immersing Eucalyptus leaves in a saccharine solution at a temperature of 160° Fahrenheit.

9. The process of forming an alcoholic ferment which consists in immersing Eucalyptus leaves in a saccharine solution in a closed sterile vessel at a temperature of 160° Fahrenheit.

10. The process of forming an alcoholic ferment from Eucalyptus leaves and a previously-boiled inverted sugar or malt wort which consists in submitting them to a temperature of 175° Fahrenheit and allowing them to cool to a temperature of 110° Fahrenheit.

In testimony whereof we have hereunto set our hands, in presence of two subscribing witnesses, this 25th day of February, 1904.

GROVE JOHNSON
PERCY RICHARD HARE.

Witnesses:
T. SELLY WARDLE,
WALTER J. SKERTEN.